US009666019B1

(12) United States Patent
Henrick et al.

(10) Patent No.: US 9,666,019 B1
(45) Date of Patent: *May 30, 2017

(54) DETERMINING PAYLINES IN A SLOT GAME BASED ON PLAYER CHARACTERS (71) Applicant: KABAM, INC., San Francisco, CA (US)

(72) Inventors: Clive Henrick, Castro Valley, CA (US); Jay Ambrosini, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,562

(22) Filed: May 18, 2016

Related U.S. Application Data (63) Continuation of application No. 14/069,119, filed on Oct. 31, 2013, now Pat. No. 9,373,226.

(51) Int. Cl.
A63F 9/24 (2006.01)
G07F 17/32 (2006.01)
(Continued)

(52) U.S. Cl.
CPC .......... G07F 17/3213 (2013.01); A63F 13/58 (2014.09); A63F 13/822 (2014.09);
(Continued)

(58) Field of Classification Search
CPC .. G07F 17/3244; G07F 17/34; G07F 17/3227; G07F 17/3239; G07F 17/3267; A63F 13/00
See application file for complete search history.

(56) References Cited

U.S. PATENT DOCUMENTS 5,810,665 A 9/1998 Takemoto
6,050,895 A 4/2000 Luciano
(Continued)

FOREIGN PATENT DOCUMENTS

KR 20150000002 A 1/2015

OTHER PUBLICATIONS

"Slots of fun!", printed from URL http://www.gamezebo.com/games/zynga-slots/review, printed on Sep. 24, 2013, 2 pages.
(Continued)

Primary Examiner — Justin Myhr
(74) Attorney, Agent, or Firm — Sheppard Mullin Richter & Hampton LLP (57) ABSTRACT A system and method for determining paylines in a slot game based on player characters are disclosed. A given player character may correspond to distinctive paylines along which symbols in a pull outcome may be assessed for rewards, for gameplays to be implemented in a game space, and/or any for other types of results provided by a slot game. In some examples, the number of the paylines corresponding to the given player character may correlate with various aspects regarding the given player character such as, without limitation, a class, a level, a race, a number of experience points, one or more skills, virtual items, and/or any other aspects regarding the given player character. In some examples, the combinations of symbols appearing on active paylines in a pull outcome may trigger one or more gameplays for implementation in a game space associated with the slot game.

18 Claims, 6 Drawing Sheets (51) Int. Cl.
*G07F 17/34* (2006.01)
*A63F 13/822* (2014.01)
*A63F 13/58* (2014.01)

(52) U.S. Cl.
CPC ........ *G07F 17/323* (2013.01); *G07F 17/3227* (2013.01); *G07F 17/3244* (2013.01); *G07F 17/3262* (2013.01); *G07F 17/34* (2013.01); *G07F 17/3239* (2013.01); *G07F 17/3255* (2013.01); *G07F 17/3267* (2013.01)

(56) References Cited

U.S. PATENT DOCUMENTS

| | | |
|---|---|---|
| 7,118,107 B2 | 10/2006 | Niedner |
| 8,202,157 B2 | 6/2012 | Packes, Jr. |
| 8,277,312 B2 | 10/2012 | Matthews |
| 8,500,546 B2 | 8/2013 | Walker |
| 8,590,897 B1 | 11/2013 | McCarey |
| 8,622,821 B1 | 1/2014 | Coronel |
| 2002/0037764 A1 | 3/2002 | Anderson |
| 2003/0114219 A1 | 6/2003 | McClintic |
| 2004/0147307 A1 | 7/2004 | Joshi |
| 2006/0040720 A1 | 2/2006 | Harrison |
| 2006/0252517 A1 | 11/2006 | Walker |
| 2007/0167239 A1 | 7/2007 | ORourke |
| 2007/0259713 A1 | 11/2007 | Fiden |
| 2007/0281775 A1 | 12/2007 | Kashima |
| 2007/0298856 A1 | 12/2007 | Gilmore |
| 2009/0153567 A1 | 6/2009 | Jung |
| 2010/0056261 A1 | 3/2010 | Englman |
| 2010/0203948 A1 | 8/2010 | Falciglia |
| 2010/0240436 A1 | 9/2010 | Wilson |
| 2011/0039609 A1 | 2/2011 | Agam |
| 2011/0244935 A1 | 10/2011 | Matthews |
| 2012/0115593 A1 | 5/2012 | Vann |
| 2012/0135797 A1 | 5/2012 | Muir |
| 2012/0196667 A1 | 8/2012 | Walker |
| 2014/0309002 A1 | 10/2014 | OGorman |
| 2015/0141127 A1 | 5/2015 | Arnone |
| 2015/0235513 A1 | 8/2015 | Arnone |

OTHER PUBLICATIONS

"You Can Soon Play Avatar Video Slot Machines", printed from http://www.comingsoon.net/news/movienews.php?id=109114, dated Sep. 18, 2013, 3 pages.

Marshall Fey, Slot Machines: A Pictorial History of the First 100 Years, 1983, Liberty Belle Press, 5th Edition, p. 167.

DETERMINING PAYLINES IN A SLOT GAME BASED ON PLAYER CHARACTERS

FIELD OF THE DISCLOSURE

This disclosure relates to slot game in which paylines in pull outcomes are determined based on player characters.

BACKGROUND

Video slot games are known. In those games, a number of virtual reels are typically presented side by side in an interface simulating a physical slot machine. Each virtual reel in those games typically includes a number of virtual slots associated with various symbols. The virtual reels may be "rotated" by the players of those games through the interface. The symbols shown in the positions on the reels visible at the end of a turn, or "pull," may be referred to as the "pull outcome." Winning symbols, e.g., matching symbols are typically assessed across multiple paylines on the virtual reels in those games. The winning symbols typically result in a player winning an amount of compensation, i.e., a payout (typically real-world money and/or credits). In those games, payouts are typically determined based on a predetermined payout table specifying an association between base amounts of payout and corresponding winning symbols.

SUMMARY

One aspect of the disclosure relates to determining paylines in a slot game based on one or more aspects regarding player characters. A given player character may correspond to distinctive paylines along which symbols in a pull outcome may be evaluated for rewards, for gameplays to be implemented in a game space associated with the slot game, and/or any for other types of results provided by the slot game. In some examples, the number of the paylines corresponding to the given player character may correlate with one or more aspects regarding the given player character such as, without limitation, a class, a level, a race, a number of experience points, one or more skills, abilities, virtual items, equipment and/or any other aspects regarding the given player character. In some implementations, determinations such as which one(s) of the paylines corresponding to the given player character may be active paylines; how many symbols and/or what symbols may be evaluated on a given active payline; direction of the active paylines; and/or any other determinations as to one or more aspects regarding the paylines corresponding to the given player character may be determined based on one or more aspects regarding the player character. In some examples, the combinations of symbols appearing on active paylines in a pull outcome may trigger one or more gameplays for implementation in a game space associated with the slot game. In those examples, the game space may be presented to the players in the slot game. This may enhance player experience in the slot game. This may enhance monetization opportunities for the provider(s) of the slot game, as the players may be motivated to spend for enhancing player characters to achieve improved paylines in the slot game and/or for improved experience in the game space.

A system configured for incentivizing and facilitating a user to forego pending wait periods of active game actions may include a server. The server may operate in a client/server architecture with one or more client computing platforms. The client computing platforms may be associated with the users of the game space. The server may be configured to execute one or more of a game space module, a player character module, a slot game module, a gameplay module, a store module, and/or other modules.

The player character module may be configured to manage player character information. The player character information managed by the player character module may reflect various aspects about player characters in the game space. For example, the player character information managed by the player character module may include information regarding a race associated with a given player character, e.g., such as human, dwarves, elves, halflings, or any other race; may include information regarding a class associated with the given player character, e.g., such as mage, fighter, thief and any other player character class; may include information regarding a level associated with the given player character; may include information regarding abilities associated with the given player character; may include information regarding skills associated with the given player character; may include information regarding an inventory of one or more virtual items associated with in the given player character; and/or any other play character information.

The slot game module may be configured to simulate, through a slot game interface, a slot game for participation by the players and to generate, for the players, pull outcomes of the slot game. The slot game simulated by the slot game may present in the slot game interface a configuration of symbols appearing on virtual reels, i.e., a pull outcome after a pull by a player. Such a configuration of symbols in a given pull outcome may be evaluated; and winning combinations of symbols may be determined according to active paylines associated with the player. In some implementations, the slot game simulated by the slot game module may be associated with a game space executed and implemented by the game space module, for example via game plots, stories, and/or any other types of narratives.

The payline module may be configured to obtain paylines for determining winning combinations of symbols in the slot game simulated by the slot game module. A given payline obtained by the payline module may include a line that connects at least two virtual slots on one or more virtual reels. In some examples, the given payline may be a line that is not straight; for example, the given payline may form a V, L, zigzag, or any other shapes. The payline module may be configured to obtain, for a player, a group of one or more paylines based on a given player character associated with the players. For example, a number of distinctive paylines may correspond to a specific class of player characters. In some implementations, the association between distinctive paylines and individual player characters may be determined and specified by provider, administrator, moderator, and/or any other entities related to the slot game and stored, for example on electronic storage coupled to or included in the server. In some examples, one or more aspects regarding a player character, as indicated by in the player character information may correlate with the number of paylines associated with the given player character: for example, the class, level, race, rank, one or more skills, virtual items, abilities, and/or any other aspects regarding the given player character may affect the number of paylines corresponding to the given player character.

In various implementations, the paylines corresponding to the given player character as obtained by the payline module may be distinctive with respect to each other and with respect to paylines associated with other player characters. In those implementations, any two of the paylines corresponding to the given player character may differ by at least one virtual slot. In those implementations, the paylines corresponding to a first player character may be distinctive from the paylines corresponding to any other player characters.

In some implementations, the payline module may determine which one(s) of the paylines corresponding to the given player character is active. For example, in a case where a fighter character corresponds to 5 paylines in the slot game, the payline module 116 may determine which ones of the 5 paylines are active paylines such that they may be used for evaluating symbols in a pull outcome. In some examples, such a determination may be based on one or more aspects regarding a player character, as indicated by the player character information such as, but not limited to, the level, race, rank, skill(s), ability or abilities, virtual item(s) and/or any other aspects regarding the player character. For example, 1 of 5 paylines corresponding to a player character may be active when the player character is at level 1; and 2 of those 5 paylines may be active after the player character progresses to level 2.

In some examples, the player character progression in various aspects may affect a number of symbols that may be evaluated on a given payline. In those examples, the number of symbols along the given payline that may be evaluated may increase (or decrease) as the given player character progresses. For example, 3 of 5 symbols appearing on a given active payline may be evaluated when the player character is at level 1; and 4 of those 5 symbols may be evaluated after the player character progresses to level 2.

In some implementations, the server may include a game space module configured to implement gameplays in a game space based on combinations of symbols included in pull outcomes of the slot game simulated by the slot game module 114. In those implementations, individual gameplays may be associated with various combinations of the symbols appearing on active paylines associated with a player as determined by the payline module 116. The game space module may determine and implement such gameplays after a pull by the player in the slot game. In some examples, the combination of symbols appearing on the active paylines in the given pull outcome may represent game space elements, such as non-player characters including monsters, creatures, and/or any other non-player characters, buildings, virtual items, virtual containers (e.g., mystery boxes), objects, and/or any other game space elements. These game space elements may be associated with various attributes in the game space, such as, but not limited to, health, hit points, defense, attack power, special abilities, armor class, virtual values associated with the game space elements (e.g., "loot"), and/or any other character attributes. The gameplays associated with the combinations of the symbols appearing on the active paylines in the given pull outcome may involve one or more actions that may be implemented in the game space in connection with the game space elements represented by the combinations of the symbols. In some examples, level, skill, item, class, equipment, action requirements, and/or any other types of requirements may be associated with the gameplays such that these requirements must be satisfied in order for the game space module to implement the gameplays in the gameplays. In some implementations, the game space module may be configured to determine results of gameplays associated with the combinations of symbols appearing on active paylines in the given pull outcome.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
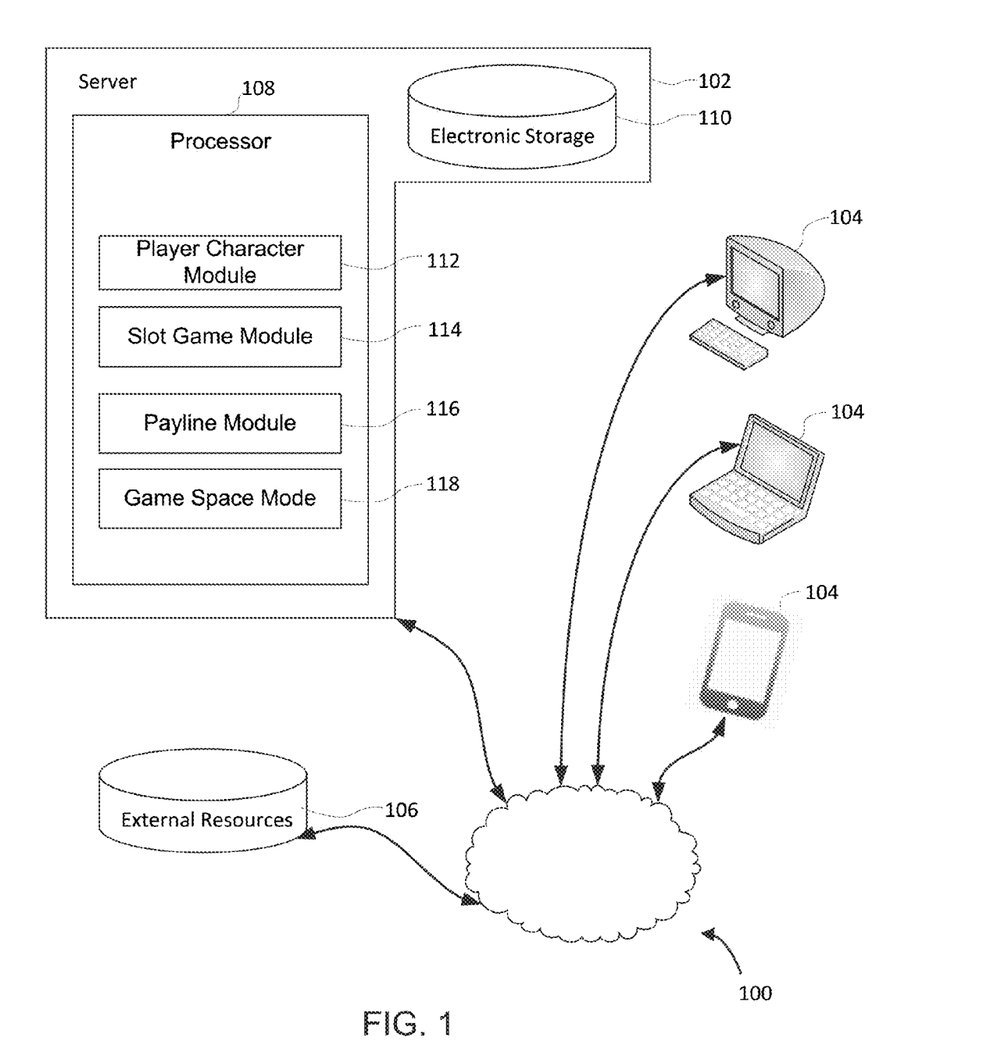
FIG. 1 illustrates a system for determining paylines in a slot game based on player characters in accordance with the disclosure.

FIG. 1 illustrates a system 100 for determining paylines in a slot game based on player characters. Providing the game space/environment may include hosting the game space/environment over a network. Providing the game space may include hosting the game space over a network. The users may access system 100 and/or the game space via client computing platforms 104.

In some implementations, system 100 may include a server 102. The server 102 may be configured to communicate with one or more client computing platforms 104 according to a client/server architecture. The users may access system 100 and/or the game space via client computing platforms 104. The computer program modules may include one or more of a player character information module 112, slot game module 114, payline module 116, game space module 118 and/or other modules.

The player character module 112 may be configured to manage information regarding play characters associated with players of a slot game. The player character information managed by the player character module 112 may reflect various aspects about such player characters including, without limitation, levels, abilities, skills, inventory, deity, health, attack, defense, sense, magic spells, language, movement, speed, and/or any other attributes associated with the player characters, and/or any other aspects about the player characters. In some implementations, these aspects about the player characters may contribute to holistic representations of the player characters in a game space associated with the slot game. Such a game space may be executed and implemented by the game space module 118 and will be described in further details in connection with the game space module 118. It should be appreciated that the player character information managed by the player character module 112 may be however specified by the provider, administrator, moderator, and/or any other entities related to the game space. For example, in some implementations, the player character information managed by the player character module 112 may reflect a limited number of aspects about the player characters for simplicity (e.g., hit points, defense and attack); while in some other implementations, the player character information managed by the player character module 112 may reflect a number of expanded aspects of the player characters. (e.g., sub-aspects such as attack power, range, level, speed and other sub-aspects may be further established under a general attack aspect about a player character).

The player character information regarding a given player character as managed by the player character module 112 may include a name, a description and/or any other identification information regarding the given character. In some implementations, the player character identification information may be determined by the provider, administrator, moderator, and/or any other entities related to the game space. In some implementations, the player character identification information may be determined by the players, for example via the interface 200 shown in FIG. 2.

The player character information regarding a given player character as managed by the player character module 112 may include information regarding a race associated with the given player character, e.g., such as human, dwarves, elves, halflings, or any other race. In some implementations, the player character race information may be determined by the provider, administrator, moderator, and/or any other entities related to the game space. The race associated with the given player may affect various characteristics of the given character. For example, a player character belonging to a human race may manifest characteristics of being adaptable, flexible, and ambitious as compared to other races in the game space; and a player character belonging to a dwarf race may manifest characteristics of being steadfast, speedy, tenacious and brave as compared with other races in the game space.

The player character information regarding a given player character as managed by the player character module 112 may include information regarding a class associated with the given player character, which may indicate a function of the given player character. The class associated with the given player character may affect other aspects associated with the given player character. For example, the class associated with the given player character may give extra abilities, skills, items and/or any other elements. For instance, fighter and paladin may be two different classes; a given player character associated with a fighter class may be given extra aspects as a striker to his repertoire (e.g., extra attack skills, attack power, magic spell cast abilities and/or any other aspects); and a given player character associated with a paladin class may be given extra abilities often associated with leaders such as healing. Some examples of typical classes that may be associated with the given player may include, but not limited to, merchant, fighter, mage, thief, cleric, wizard, warlord, rouge, ranger, warlock and any other classes. In some exemplary implementations, the class associated with the given character may define a role the given player plays in adventures in the game space associated with the slot game, for example such as the game space executed and implemented by game space module 118. In some implementations, the player character class information may be determined by the provider, administrator, moderator, and/or any other entities related to the slot game. In some implementations, the player character class information may be determined by the players of the slot game.

The player character information regarding a given player character as managed by the player character module 112 may include information regarding a level associated with the given player character. Such level information about the given player character may reflect relative experiences of the player in the slot game, relative adventure experiences by the given player in the game space, and/or any other states associated with the player or the player characters. With each new level the given player character attains, the player character becomes more experienced, which may be reflected by enhancements in various characteristics associated with the given player character. In some exemplary implementations, the level associated with the given player character may be manifested via numerical number(s) expressed as experience points ("XP"). In some implementations where the game space is associated with the slot game, the given character may earn XPs by, for example, without limitation, defeating monsters, completing skill challenges, collect virtual items, amass virtual currencies, items, resources, objects, real-world money, credits and/or any other values associated with the game space, and/or other gameplays. Typically, when a number of XPs of the given player character reaches a milestone, the given player character may attain a new level. For example, as an illustration, between 0-1,000 XP, the given player character may be associated with level 0 within the game space; between 1,000-2,500 XP, the given player character may be associated with level 1 within the game space; between 2,500-5,000 XP, the given player character may be associated with level 2 within the game space; and so on.

The player character information regarding a given player character as managed by the player character module 112 may include information regarding abilities associated with the given player character. Some common examples of abilities associated with the given player character may include strength, dexterity, constitution, intelligence, wisdom, charisma, perception, diplomacy, negotiation, and/or any other abilities. Typically, the abilities associated with the given player character may be represented by numeric score, reflecting quality of these abilities by the given player character. For example, the given player character may be associated with an ability score of 18 (out of 20) in strength, which may mean the given character has excellent strength. On the other hand, the given character may be associated with an ability score of 5 (out of 20) in wisdom, which means the given character has poor intelligence. Typically, as the given player character progress through adventures in the game space, the ability scores associated with the given player character may increase or decrease along with the level associated with the player character; and the given player character may acquire new abilities when reaching certain milestones in the game space.

The player character information regarding a given player character as managed by the player character module 112 may include information regarding basic attributes associated with the given player character, such as speed, stamina, hit points, and/or any other basic attributes reflecting various aspects about the given player character. For example, a number of hit points may be associated with the given player character reflecting how much damage the given player character may withstand from attack; a number of stamina points may be associated with the given player reflecting how much energy the given player character may expand for actions; and so on.

The player character information regarding a given player character as managed by the player character module 112 may include information regarding skills associated with the given player character, which may represent training, education and/or any other learned aspects of the given player character. In some examples, the skill(s) associated with the given player character may provide capabilities extra to those inherent in the class and/or race associated with the given player character. In those implementations where the game space is associated with the slot game, skills may be acquired or learned by the given player character during adventures in the game space by the given player character. For example, the given player character may collect a scroll to learn a specific skill (e.g., lock-picking) during an adventure in the game space by defeating a monster. In some implementations, ranks, levels, and/or any other classification systems may be established for a given category of a skill. For example, a climb skill in the game space may have 10 levels such that gaining each new level of the climb skill gives a player character extra climb capabilities in the game space. In another example, a lock-picking skill may have 5 levels, and within each level there are 4 ranks such that each new level and rank combination gives the player character capabilities to open different kinds of locks in the game space. The player character typically starts out in the game space with a set of skills, which in some examples are determined based on the class, race and/or any other factors associated with the player character. As the player character progress in the game space through adventures, the player character may also progress along levels and ranks in existing skills, learn new skills, and/or otherwise progress along skill trees provided in the game space.

In some implementations, the progress of a given player character on a skill tree may be limited based on level, experience points, and/or any other attributes associated with the given player character. For example, a level 1 fighter may acquire up to level 4 in Climb, up to level 2 in Jump, and up to level 1 in Spot; a level 2 fighter may acquire up to level 8 in Climb, up to level 5 in Jump, and up to level 2 in Spot; a level 4 cleric may acquire up to level 2 in Climb, up to level 2 in Jump, and up to level 1 in Spot; and so on. Typically, the higher level the given player character is, the more skills and the higher levels of the skills may be acquired by the given player character and thus may be called upon during adventures (e.g., encounters with monsters) in the game space. In some examples, the effectiveness of the skills acquired by the given player character may correlate with abilities associated with the given player character. For example, if the given player character is good at dexterity as reflected by the dexterity score associated with the given player character, the given player character may be more effective in applying his lock picking skill in certain adventures.

The player character information regarding a given player character as managed by the player character module 112 may include information regarding an inventory of one or more virtual items associated with in the given player character. For example, the given player character may carry virtual items such as, without limitation, sword, armor, glove, healing potion, and/or any other virtual items. For such gear carried by the given player character, body slots may be assigned to correspond various body parts of the given player character. In some examples, the given player character may be associated with an inventory of virtual items that have been acquired by the given player character in the game space through adventures. The inventory associated with the given player character may have a dimensionality such that virtual items in the inventory may take different amounts of space to reflect dimensions of these virtual items. Virtual items that are collected by the player, for example via defeating monsters, looting buildings, and/or in any other ways may be stored in the inventory and may be accessed by the player. In some implementations, a given player character may be associated with a number of body slots such that the player may assign one or more items in the inventory to various equipment slots of the given player character. In this way, the virtual items assigned to the equipment slots associated with the given player character become gears carried around by the given player character in the game space for adventures.

Figure 2:
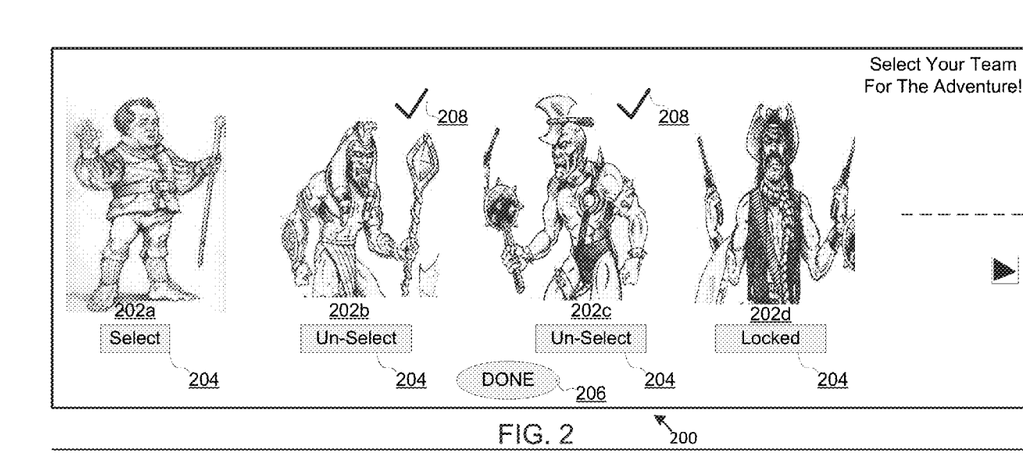
FIG. 2 illustrates one example of facilitating a player of the slot game to select player characters using the system shown in FIG. 1.

FIG. 2 illustrates one example of facilitating a player of the slot game to select player characters using system 100 shown in FIG. 1. As shown in this example, a player selection interface 200 may be provided by the system 100, for example on client computing platforms 104 to enable the player to select one or more player characters to be associated with that player in the slot game that will be described in further details in FIGS. 4-7. As illustrated in FIG. 2, the interface 200 may include graphics representing player characters 202 that may be selected by players. Field controls 204 such as select buttons shown in this example may be provided in the interface 200 to enable the players to select individual player characters to be associated with the players. As also shown, indicators 208 may be presented in the interface 200 to indicate that the selected player characters. As still shown in this example, one or more player characters may not be available for selection by the player at a given point of time; and may be presented as locked characters in the interface 200. Such locked characters may become unlocked as the players reach certain milestones (e.g., reach certain XP levels, accumulated certain amount of coins and/or any other milestones). As shown, a button 206 may be provided in the interface 200 to enable the players to finish selecting the player characters.

Figure 3:
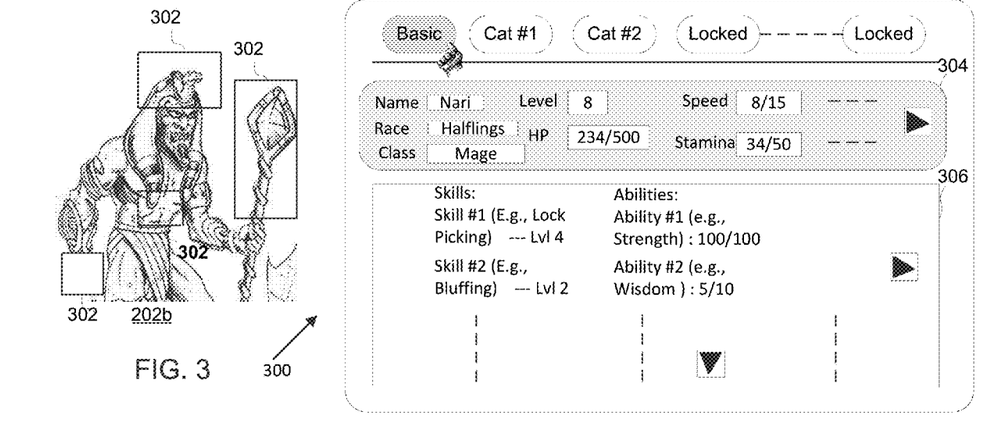
FIG. 3 illustrates one example of a player character shown in FIG. 2.

FIG. 3 illustrates one example of a player character shown in FIG. 2. It will be described with references to FIG. 2. As shown, the player character 202b as shown in FIG. 2 may have equipment slots 302 on the player character 202's body. Virtual items may be assigned by players to the equipment slots 302 such that the assigned virtual items become equipment carried around by the player character 202 in the game space. As illustrated in FIG. 2, the player character 202b in this example is associated with an equipment slot in his left hand and a magic staff is assigned to that equipment slot such that the player character carries the magic staff in the game space; and is associated with a magic hat in head slot 302 and a magic headband is assigned to that slot such that the player character 202 wears the headband when moves around in the game space. Also illustrated in this example is that the equipment slots 302 (such as belt, right hand as shown in this example) may be empty without any virtual items are assigned to them.

Also shown in FIG. 3 is a player character information interface 300 presenting various player character information regarding the player character 202. As shown, a basic information pane 304 may be presented in the player character interface 300 for presenting basic attributes associated with the player character 202 as illustrated in FIG. 3. Also illustrated in this example is a detail player character information pane 306 for presenting various skills, abilities and/or any other characteristics associated with the player character 202.

Returning to FIG. 1, the slot game module 114 may be configured to simulate, through a slot game interface, a slot game for participation by the players and to generate, for the players, pull outcomes of the slot game. Through the slot game simulated by the slot game module 114, the players may be facilitated to effectuate a rotation of virtual reels simultaneously or near simultaneously to achieve one or more combinations of matching symbols in pull outcomes. The rotation of the virtual reels (i.e., a pull) may be effectuated by the players through various slot plays including, but not limited to, pressing a virtual pull button, placing various bets (e.g., incremental bet, max bet), selecting a multiplier, and/or any other slot play actions. After a given pull by a player, the virtual reels may stop at a configuration stochastically or quasi-stochastically representing a pull outcome such that symbols may statically appear on virtual slots of the visible portion of virtual reels.

The slot game module 114 may be configured to evaluate symbols in a given pull outcome and determined winning combinations of the symbols based on active paylines associated with a player. The active paylines associated with the player may be obtained and/or determined by the payline module 116, which will be described in further details in connection with FIGS. 5-7. In some examples, the player may be associated with two active paylines intersecting each other such that the two active paylines share one or more symbols in common. In those examples, the slot game module 114 may be configured to determine that such symbols in common as winning symbol(s).

In some implementations, the slot game simulated by the slot game module 114 may be associated with a game space executed and implemented by the game space module 118, for example via game plots, stories, and/or any other types of narratives. The symbols associated with the slot games simulated by the slot game module 114 may represent various game space elements, such as, without limitation, non-player characters including monsters, creatures, enemy or friendly combatants, and/or any other non-player characters, buildings, virtual items, virtual containers, treasures, objects, and/or any other game space elements. As described herein, the game space elements represented by the symbols associated with the slot game may be associated with attributes reflecting various characteristics of these game space elements in the game space.

Figure 4:
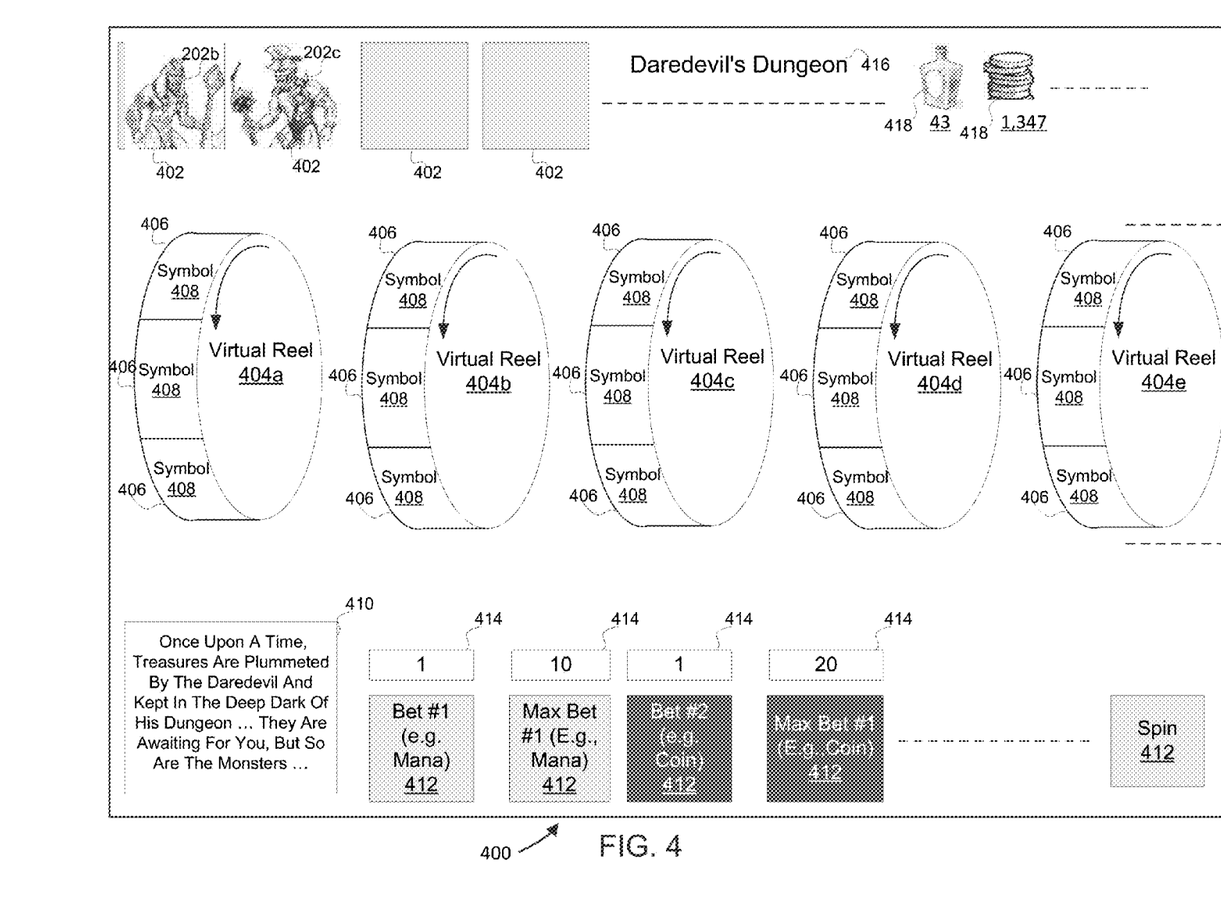
FIG. 4 illustrates one example of a slot game interface for simulating a slot game in accordance with the disclosure.

FIG. 4 illustrates one example of a slot game interface for simulating a slot game in accordance with the disclosure. As shown in this example, the slot game interface 400 may be implemented to facilitate players to participate in slot games. As illustrated, the slot game interface 400 may include one or more player character slots 402 indicating player characters associate with players of the slot game facilitated by the slot game interface 400. As described in FIG. 2, in some implementations, the player characters appearing in player character slots 402 may be selected by players through an interface 200. It should be appreciated that although four player character slots 402 are shown in this example, this is not intended to be limiting. In some other examples, the number of player character slots 402 may be more or less than four.

In any case, as illustrated, the slot game interface 400 may include one or more virtual reels, such as virtual reels 404a-e shown in this example. Visual effects of the virtual reels 404 being rotated may be simulated and presented through the slot game interface 400. As shown, a given virtual reel 404 may comprise virtual slots 406. As shown, a number of virtual slots 406 on the virtual reels 404 may be presented in the slot game interface 400 statically to simulate the visual effect that the virtual reels 404 are stopped at a configuration stochastically or quasi-stochastically as a pull outcome. Also shown in this example is that individual virtual slots 406 may be associated with symbols 408. It should be appreciated the number of virtual reels and the number of virtual slots on an individual virtual reel are illustrated merely as a non-limiting example. In some other examples, such numbers may be more or less than those illustrated in FIG. 2.

As shown in this example, the slot game interface 400 may include one or more buttons 410 to enable the players to place various bets including, without limitation, virtual values, items, credits, real-world money, and/or any other type of bets to affect outcome of the slot game facilitated by the slot game interface 400. The bets placed by the players as facilitated by the slot game interface 400 may affect various aspects of an outcome of the slot game, for example such as, but not limited to, a value of one or more multipliers, symbols that may be played (e.g., symbols representing exciting game space elements, wild, scatter), a number of bonus games that may be played, and/or any other aspects of the slot game. As illustrated, in this example, the bets include virtual items such as mana, virtual currencies such as coins, and other type of bets (not shown in this example for clarity). As shown, indicators 414 may be presented in the slot game interface 400 to indicate amounts of bets a player has placed in the slot game. As also shown, the indicators 418 may be presented in the slot game interface 400 to display balances of bet-able objects in player accounts associated with players. In some implementation, the slot game interface 400 may facilitate players to purchase additional bet-able objects, e.g., via a store interface.

Also shown in FIG. 4 is a story window 410 presenting a narrative regarding a game space associated with the slot game facilitated by the slot game interface 400. As shown, the story window 410 may present narrative information indicating a location in the game space associated with the slot game. In this example, the slot game is associated with a dungeon in the game space with monsters and treasures in the dungeon. As also shown, the location of the game space environment associated with the slot game may be indicated in the slot game interface through title 416. It should be understood, although in this example the narrative information about the game space is illustrated as texts, this is not intended to be limiting. In some other examples, such narrative information about the game space may be presented with audio and/or video effects, such as, but not limited to, animation, 3D graphics, surround sound, interactive voice, and/or any other audio/video effects.

Returning to FIG. 1, the payline module 116 may be configured obtain paylines for determining winning combinations of symbols in the slot game simulated by the slot game module. A given payline obtained by the payline module 116 may include a line that connects at least two virtual slots on one or more virtual reels, such as the virtual slots 406 on virtual reels 404 shown in FIG. 4. The virtual slots connected by the payline may be located on the same virtual reel or on different virtual reels. In some examples, the given payline may be a line that is not straight; for example, the given payline may form a V, L, zigzag, or any other shapes. Symbols appearing on virtual slots along the payline may be assessed, for example by the slot game module 114 for determining one or more winning combinations of symbols. In some implementations, the payline may specify a direction in which such combinations of symbols may be assessed and determined, for example, without limitation, left to right, top to down and/or any other directions.

In any case, the payline module 116 may be configured to obtain, for a player, a group of one or more paylines based on a given player character associated with the players. For example, a number of distinctive paylines may correspond to a specific class of the given player. For instance, player characters having a fighter class may correspond to a number (e.g., 5) of paylines starting at the up left corner of slots on the virtual reels, such as the slot 1,1 408 shown in FIG. 4. In some implementations, such associations between distinctive paylines and individual character classes may be determined and specified by provider, administrator, moderator, and/or any other entities related to the slot game and stored, for example on electronic storage 110. In some other implementations, the associations between distinctive paylines and corresponding player characters may be determined dynamically according to some programming rules configured into payline module 116. For instance, the number of paylines corresponding to a player character may be temporarily increased for a period to incentivize a player to select that character in the slot game. However, character class is not necessarily the only criteria for the number of the paylines associated with player characters having the character class. In some examples, other player character information may correlate with the number of paylines associated with the given player character: for example, the level, race, rank one or more skills, virtual items, abilities, and/or any other aspects regarding the given player character may affect the number of paylines corresponding to the given player. By way of a non-limiting example, the level and a class associated with the given player character may in combination correlate with the number of distinctive paylines associated with the given player character: for instance, a level 1 fighter may provide 2 paylines, a level 2 fighter may provide 3 paylines, a level 1 mage may provide 3 paylines, a level 2 mage may provide 4 paylines and so on.

In various implementations, the paylines corresponding to the given player character as obtained by the payline module 116 may be distinctive with respect to each other and to paylines associated with other player characters. In those implementations, any two of the paylines corresponding to the given player character may differ by at least one virtual slot. In those implementations, the paylines corresponding to a first player character may be distinctive from the paylines corresponding to any other player characters. By way of a non-limiting example, a player may be associated with a fighter character and a mage character in the slot game; the fighter character may correspond to 5 paylines which are distinctive with respect to each other such that they differ by at least one symbol; likewise, the mage character may correspond to such 5 distinctive paylines; and the paylines corresponding to the fighter characters may distinctive from the paylines corresponding to the mage character.

Figure 5:
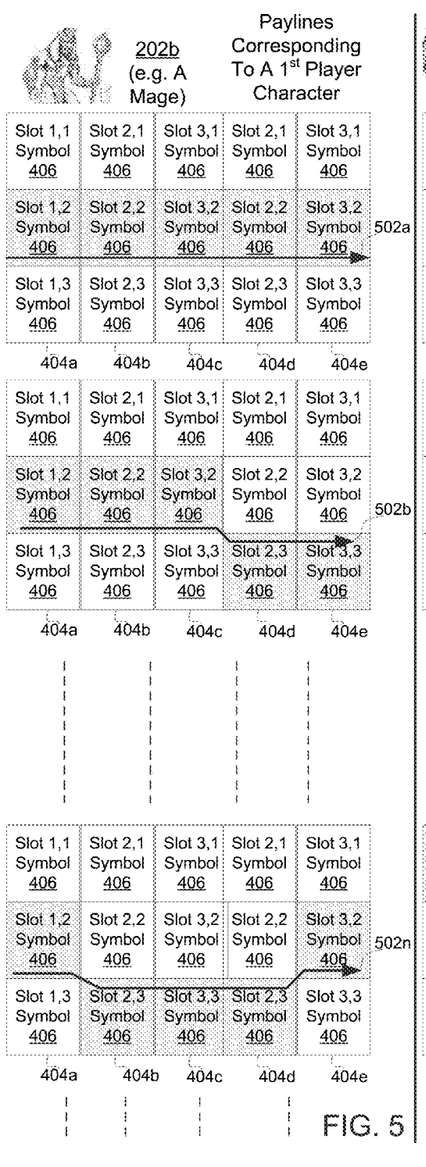
FIG. 5 illustrates one example of a group of paylines corresponding to a player character shown in FIGS. 2 and 4.

FIG. 5 illustrates one example of a group of paylines corresponding to a player character shown in FIGS. 2 and 4. It will be described with references to FIGS. 2 and 4. In this example, the paylines shown correspond to the player character 202b shown in FIG. 2 and FIG. 4. Specifically, the player character 202b having a character class as a mage corresponds to a number of paylines 502 as shown. As also shown, a given payline 502, e.g., payline 502a may define a number of virtual slots 406 on the virtual reels 404 for evaluation of symbols appearing on payline 502a. As also shown, the payline 502a may specify a direction by which the symbols appearing on the payline 502a should be evaluated for one or more winning combinations. As illustrated, the paylines 502 associated with the player character 202b may be distinctive such that they differ by at least one virtual slot.

Figure 6:
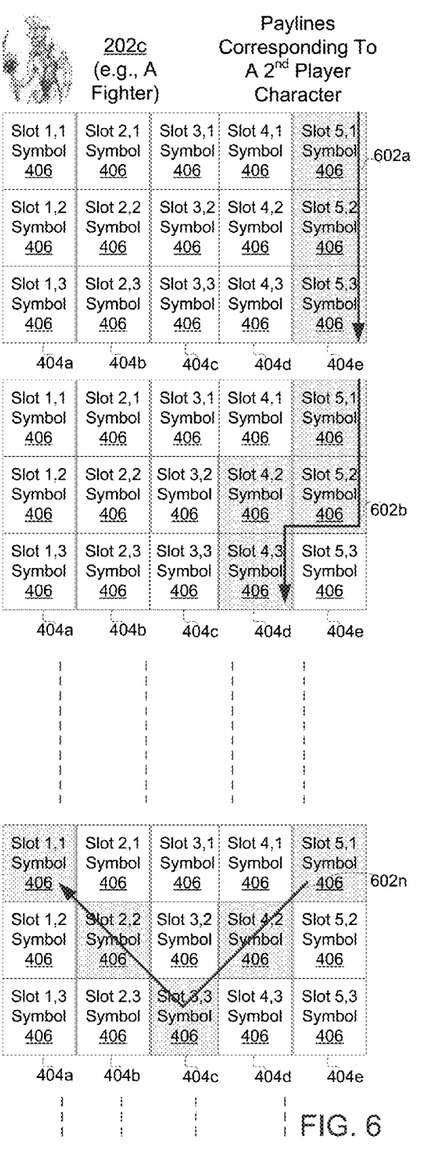
FIG. 6 illustrates another example of a group of paylines corresponding to a player character shown in FIGS. 2 and 4.

FIG. 6 illustrates another example of a group of paylines corresponding to a player character shown in FIGS. 2 and 4. It will be described with references to FIGS. 2 and 4. In this example, the paylines shown correspond to the player character 202c shown in FIG. 2 and FIG. 4. Specifically, the player character 202c having a character class as a fighter corresponds to a number of paylines 602 as shown. As shown, a given payline 602, e.g., payline 602a may define a number of virtual slots 406 on the virtual reels 404 for evaluation of symbols appearing on payline 602a as illustrated. As also shown, the payline 602a may specify a direction by which the symbols appearing on the payline 602a should be evaluated for one or more winning combinations. As illustrated, the paylines 602 associated with the player character 202c may be distinctive such that they differ by at least one virtual slot. As also illustrated in this example, the paylines 502 and 602 may be distinctive to each other.

Returning to FIG. 1, in some implementations, the payline module 116 may determine which one(s) of the paylines corresponding to the given player character is active. For example, in the case described above where a fighter character corresponds to 5 paylines in the slot game, the payline module 116 may determine which ones of the 5 paylines are active paylines such that they may be used for assessing symbols in a pull outcome by a player associated with the fighter character. In some examples, such a determination may be based on the player character information regarding the player character (e.g., the fighter), such as, but not limited to, the level, race, rank, skill(s), ability or abilities, virtual item(s) and/or any other attributes associated with the player character.

Figure 7A:
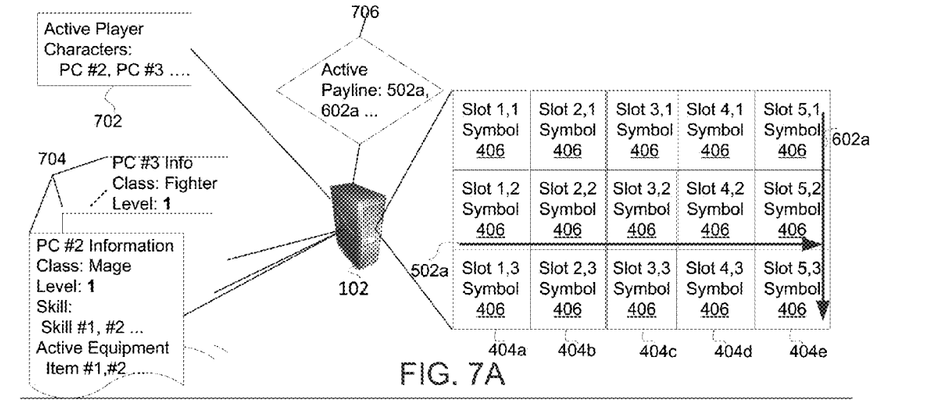
FIG. 7A illustrates one example of determining a number of active ones of the paylines shown in FIGS. 5-6 based on player character information.

FIG. 7A illustrates one example of determining a number of active ones of the paylines shown in FIGS. 5-6 based on player character information. As shown, the server 102 may, e.g., via the player character information module 112 determine active player characters associated with a given player of the slot game. In this example, the server 102 makes the determination 702 that the given player is associated with player characters #2, #3, i.e., player characters 202b and c shown in FIGS. 2 and 4, and other player characters (not shown in this example for clarity of illustration). As also shown, the server may, e.g., via the player character information module 112 obtains player character information 704 regarding the player characters #2 and #3. As illustrated, the player character information 704 may indicate a level, one or more skills, one or more virtual items, one or more abilities, basic attributes (e.g., vital statistics, hit points, speed, and any other basic attributes), a rank, a number of experience points, and/or any other aspects about the player characters. As illustrated in this example, based on the player character information 704, the server 102, e.g., via payline module 116 may determine that payline 502a is the only active payline among the paylines 502 corresponding to the player character #2, and that payline 602a is the only active payline among the paylines 602 corresponding to the player character #3. Such a determination 706 by the server 102 may be based on, for example the level of the player characters and/or any other characteristics as desired. For instance, as shown in this example, the determination 706 may be made based on that player character #2 is at level 1. It should be appreciated this is merely illustrative, and the number of active paylines among the paylines corresponding to a given player character may correlate any one or multiple of aspects of the given player character as however desired.

In some implementations, the symbol(s) shared by two active paylines may be determined by the server 102, e.g., via the slot game module 114 as winning symbol(s). For example, as shown in FIG. 7A, the slot 5,2 is where active paylines 502*a* and 602*a* intersect. In those implementations, the symbol appearing on slot 5,2 may be determined by the server 102, e.g., via the slot game module 114 as the winning symbol.

Figure 7B:
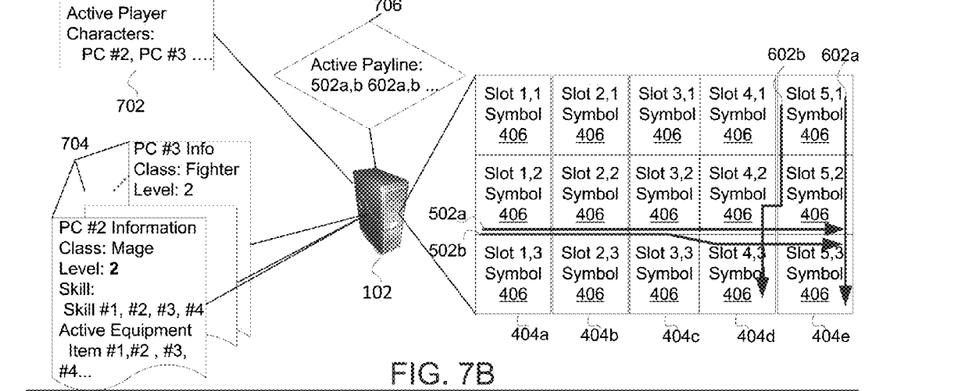
FIG. 7B illustrates another example of determining a number of active ones of the paylines shown in FIGS. 5-6 based on player character information.

FIG. 7B illustrates another example of determining a number of active ones of the paylines shown in FIGS. 5-6 based on player character information. As illustrated in this example, based on the player character information 704, the server 102, e.g., via payline module 116 may determine that paylines 502*a* and *b* are the only active paylines among the paylines 502 associated with the player character #2, and that payline 602*a* are the only active payline among the paylines associated with the player character #3. Such a determination 706 made by server 102 as illustrated in FIG. 7B may be based on the player character information indicating the player characters #2 and #3, for example having a higher level and/or other statistics more advanced than the player characters #2 and #3 shown in FIG. 7A. This may happen when the player characters #2 and #3 progress in a game space associated with the slot game, the given player character progresses in the slot game, and/or any other in any other situations. In any case, as shown 7B, the number of active paylines among the paylines associated with a given player character may increase (or decrease) as the player given character progresses in various attributes.

Figure 7C:
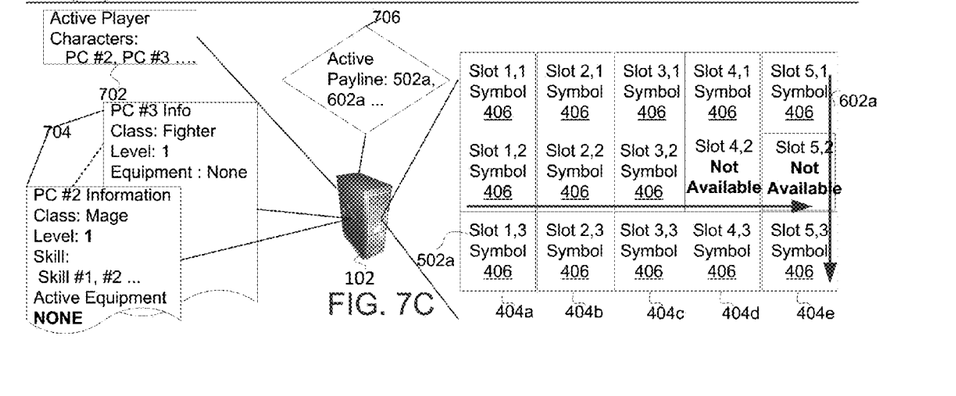
FIG. 7C illustrates one example of determining a number of symbols that may be evaluated on a given payline based on player character information.

In some examples, the player character progression in various attributes may affect a number of symbols that may be evaluated on a given payline. In those examples, the number of symbols along the given payline that may be evaluated may increase (or decrease) as the given player character progresses. FIG. 7C illustrates one example of determining a number of symbols that may be evaluated on a given payline based on player character information. As shown, in this example, the server 102 may, e.g., via the payline module 116 determine that symbols appearing on slot 4,2 on the virtual reel 404*d* and slot 5,2 on the virtual reel 404*e* may not be evaluated (e.g., not available for play in the slot game) for determining winning combinations of symbols. Such a determination may be based on the player character information regarding player characters #2 and #3. As illustrated, this results in the active payline 502*a* become "shorter" as illustrated and the active payline 602*a* truncated (in some examples, a truncated payline may still be used for symbol evaluation wherein the winning combinations of symbols do not necessarily have to be adjacent to each other on the virtual reels). As illustrated, in this example, such a determination is based on that player character #2 is not associated with any active equipment. It should be appreciated this is merely illustrative. In other examples, the determination as to the number of symbols that may be evaluated on a given payline may be based on any one or multiple aspects associated with the given player character as however desired.

Returning to FIG. 1, in some implementations, the server 102 may include a game space module 118 configured to implement gameplays in a game space based on combinations of symbols included in pull outcomes of the slot game simulated by the slot game module 114. In those implementations, based on the combination of symbols appearing on the active paylines associated with a player as determined by the payline module 116, the game space module 118 may be configured to determine states of the game space communicated (e.g., via textual data, visual data, object/position data, and/or other state information) from server 102 to client computing platforms 104 for presentation to users. A given game space state determined and transmitted to a given client computing platform 104 may correspond to a description, a representation, a view and/or any other suitable form for presenting the player characters via the given client computing platform 104 at a given point of time in the game space. The given game space state determined and transmitted to the given client computing platform 104 may correspond to a location or locations from which a scene in the game space takes place. Within such a scene, creatures, monsters, items, treasures, buildings and/or any other game space elements may occupy various positions in the location(s) corresponding to the scene. In some implementation, the given state of the game space may be presented in a slot game interface implemented on client computing platform 104, such as the slot game interface 400 shown in FIG. 4.

Within the instance of the game space, players may participate in the game space through player characters to experience the game space. In some examples, the gameplays in the instance of the game space may involve, without limitation, exploring the game space, encountering and fighting the creatures, monsters, and/or any other game space elements, collecting and amassing virtual currencies, resources, treasures, real-world money and/or any other values, interacting with non-player characters, and/or any other types of gameplays.

The instance of the game space and/or the game that takes place therein may be persistent. That is, the game space may continue on whether or not individual players are currently logged in and/or participating in the game space. A player that logs out of the game space and then logs back in some time later may find the game space has been changed through the interactions of characters not controlled by the player with the game space during the time the player was logged out. These changes may include changes to the simulated physical space of the game space, changes in the player's inventory, changes in other users' inventories, changes experienced by characters not controlled by the player, and/or other changes.

The instance of the game space may comprise a simulated space that is accessible by users via clients (e.g., client computing platforms 104) that present the description, representation, views and/or any other forms of presentation of the game space to a user, for example in the slot game interface shown in FIG. 4. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the game space is determined by game space module 118 is not intended to be limiting. The game space module 118 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

The instance of the game space executed by the game space module 118 may comprise characters not associated with any player. As used herein, such characters in the instance of the game space are referred to as "non-player characters". Examples of non-player characters may include, without limitation, monsters, magic creatures, mercenaries, merchants, villagers, priests, and/or any other characters not associated with any player in the game space. Certain traits, attributes and/or characteristics may be manifested by, possessed by and/or otherwise associated with the non-player characters. As an illustration, the traits, attributes and/or characteristics associated with non-player characters may include level, size, origin, race, type, class, experience points (XP), vitality attributes (e.g., hit points, health, stamina, strength and/or any other vitality attributes), various abilities, skills and/or any other acquired acumens, attack powers (e.g., as satiated by type, action(s) enabled, recharge, reach, range, area, target, attack bonus, target defense and/or any other aspects that may be associated with attack powers), and/or other traits, attributes and/or characteristics associated with such characters. Such characteristics associated with non-player characters may be represented by natural numbers. For example, a monster may have 100 hit points, 50 attack power points, 2 units of attack range, and so on. Some non-player characters may be associated with virtual currencies, treasures, items (e.g., mystery boxes, equipment scrolls, and/or any other virtual items), resources, objects, real-world money, credits and/or any other values associated with the game space. For example, the monster described above may be associated with a coin bag consisting of 100 coins and a magic knife has 5 gem sockets. Such values associated with non-player characters may be collected by the players upon maturation of certain conditions. For examples, the bag of 100 coins and the magic knife associated with the monster and may be collected by the player once the hit points of the monster reaches 0.

Within the instance of game space executed by the game space module 118, player characters associated with the player of the slot game may interact with game space elements. For example, the player characters may encounter game space elements such as, without limitation, non-player characters including monsters, creatures and/or any other non-player characters, objects, buildings, virtual items, virtual containers (e.g., mystery boxes) and/or any other game space elements. For example, a given player character may encounter a group of monsters at a location within the game space, e.g., in a dungeon. Such an encounter may take place as directed by pull outcomes of slot game described herein. For example, a combination of symbols appearing on an active payline in a pull outcome may represent a group of monsters (two or more) in the game space; and the combination of the symbols may result in the encounter between the player character and the group of monsters in the game space. In some examples, such combat encounters may in turn result in one or more combative actions between the player characters and the group of monsters.

However, not all encounters between the player characters and the non-player characters may result in combat actions described above. In some examples, the encounters between the player characters and certain non-player characters may result in non-combat actions which may trigger, for example a quest challenge, a skill challenge and/or any other types of challenges. For example, a given player character may encounter a sage in the game space (e.g., as directed by a combination of symbols appearing on an active payline graphically representing the mage) and the sage may challenge the player character to collect 5000 coins in the next hour for a rare virtual item in the game space. Such non-combative encounters typically result in rewards. The rewards may include virtual currencies, items, resources, objects, real-world money, credits and/or any other values associated with the game space.

In some implementations, the game space module 118 may be configured to implement the game space by determining a state of the game space at a given time. This may involve implementing results of encounters, quests, skill challenges, treasure collection and/or any other gameplays in the game space. The state change of the game space determined by the game space module 118 may include state change(s) of one or more player characters in the game space. For example, a state change of a given player character may be based on a result of an action between the given player character and a monster during a combat encounter in the game space. The state change of the given player character may include adjustments of one or more attributes associated with the player characters. By way of non-limiting example, the state change of the player character during the combat encounter may include a change in hit points, strength, stamina, virtual items and/or any other attributes associated with the given player character (e.g., reduced) as a result or results of the combat encounters.

The state change(s) determined by the game space module 118 may include state changes of non-player characters, buildings, objects, and/or any other elements in the game space not associated with players. For example, the combat encounter between the given player character and the group of monsters described above may result in reduction in certain attributes associate with the monsters, such as hit points of the monsters and/or any other attributes associated with the monsters. For instance, the game space module 118 may determine that the player character incurred 40 hit point loss on the monsters and the monsters' hit points thus are reduced by 40. In another example, integrity, e.g., also measured by hit points of a building the game space may be reduced by an attack action by the given player character in the game space: for example, the given player character threw flames at the building and reduces hit points of the building. In various implementations, the game space elements (including player characters) may be eliminated from the game space when the game space module 118 determines the state change of these game space elements cause some attributes associated with these game space elements to reach 0 or below. For example, the player character may be eliminated (e.g., killed) in the game space if the hit points associated with the player character reaches 0 or below; a monster may be eliminated from the game space if the hit points associated with the monster reaches 0 or blow; and a building may be eliminated (e.g., demolished or removed) from the game space if the hit points associated with the building reach 0 or below, and so on. In some examples, the game space module 118 may increase or decrease balances of, for example virtual currencies, credit, real world money and/or any other values associated with the players based on the state change(s) determined by the game space module 118. For instance, a given player character may pick up treasures dropped by a monster after the monster is killed during a combat encounter between the player character and the monster. In that instance, the treasures (e.g., virtual currencies like gems) may be added to an account associated with the player.

Within the instance of the game space executed by the game space module 118, virtual currencies, items, resources, objects, real-world money, credits and/or any other values associated with the game space may be provided available in various ways. For example, a monster may be associated with such values such that when the monster is killed in a combat encounter by a play character, the values associated with the monster (e.g., a bag of coins) may be collected by the play character. In some examples, such values may be available in the game space simply for the player character to collect. That is, in those examples, such values may be encountered by the player character, e.g., via symbols of the slot games, and result in being collected by the player character. In some examples, to collect the values, requirements, such as skill, ability, level, experience points, and/or any other requirements may be imposed on the player character. For example, a mystery box collected by the player after a slot play may require a level 2 lock picking skill by a player character associated with the player. In that example, such a mystery box may not be opened until the player character acquires the level 2 lock picking skill.

The game space module 118 may be configured to determine and implement gameplays in the game space based on the combinations of the symbols in the pull outcomes generated by the slot game module. For a given combination of symbols appearing on an active payline in a pull outcome, one or more gameplays may be determined by the game space module 118 for implementation in the game space. In some implementations, for such determinations, the game space module 118 may be configured with one or more symbol-gameplay table(s), which may specify associations between combinations of symbols appearing on active paylines in the pull outcomes and corresponding gameplays that may be implemented in the game space. In some examples, the combination of symbols in the pull outcomes may represent game space elements, such as non-player characters including monsters, creatures, and/or any other non-player characters, buildings, virtual items, virtual containers (e.g., mystery boxes), objects, and/or any other game space elements. These game space elements may be associated with various attributes in the game space, such as, but not limited to, health, hit points, defense, attack power, special abilities, armor class, virtual values associated with the game space elements (e.g., "loot"), and/or any other character attributes.

The gameplays associated with the combinations of the symbols in the pull outcomes may involve one or more actions that may be performed in the game space in connection with the game space elements represented by the combinations of the symbols. In some examples, level, skill, item, class, equipment, action requirements, and/or any other types of requirements may be associated with the gameplays such that these requirements must be satisfied in order for the game space module to implement the gameplays in the gameplays. For example, a gameplay may be associated with a skill requirement such that the gameplay may be implemented in the game space only if the skill requirement is met by the player character(s). In some implementations, the gameplay module may be configured to determine which of the gameplays corresponding to the combinations of the symbols in the pull outcome may be implemented in the game space. This may involve examining the player character information in view of the requirements associated with those gameplays. For example, if the combinations of symbols in the pull outcome correspond to 5 gameplays, the game space module 118 may determine that 3 of the 5 gameplays may be implemented in the game space because the player character(s) meets the requirements associated with those 3 gameplays; while 2 of the 5 gameplays may not be implemented in the game space because the player character(s) do not meet the requirements associated with those 2 game plays. In some implementations, the game space module 118 may determine game actions involved in a given gameplay that may be implemented in the game space while other game actions in the gameplay may not be implemented based on the player character information and requirements associated with the game actions involved in the given gameplay.

In some implementations, the game space module 118 may be configured to determine results of gameplays associated with the combinations of symbols in the pull outcomes. This may involve determining, based on the player character information indicating the level, skill(s), class, equipment, abilities and/or any other attributes of the player character(s), amounts of damages incurred by the player character to one or more targets, e.g., monsters represented by the combinations of the symbols in the pull outcome; amounts of damages from the one or more targets resisted by the player character, distances of projectiles launched by the player character, amounts of treasures collected by the player characters; amounts of space moved by the player character, one or more virtual items spotted by the player character, and/or any other results of the gameplays. For example, in a case where a combat encounter gameplay corresponds to a combination of symbols in the pull outcome, the gameplay module may be configured to determine an amount of damages incurred on the targets by the player character(s) during the combat encounter. For instance, if the player character has an advanced weapon ×2 amount of damages may be incurred on the targets as compared to the player character has normal weapon. In some example, the amount of virtual currencies, items, resources, objects, real-world money, credits and/or any other values associated with the game space that may be collected by the player character (s) through the gameplays may be determined based on various character attributes such as, but not limited to, a level, one or more skills, one or more virtual items, class, inventory of virtual items, equipment and/or any other attributes associated with the player character(s). For example, the game space module 118 may determine a player character may collect 100 coins from a coin bag represented by a combination of symbols in the pull outcome if the player character is at level 1 in the game space; may collect 200 coins from the coin bag if the player character is at level 2; may collect 300 coins from the coin bag if the player character is at level 3; and so on.

The server 102, client computing platforms 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 106 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute modules 112, 114, 116, 118. Processor 108 may be configured to execute modules 112, 114, 116, 118 by software; hardware; firmware; some combination of software, hardware, and/or firmware; and/or other mechanisms for configuring processing capabilities on processor 108.

It should be appreciated that although modules 112, 114, 116, 118 are illustrated in FIG. 1 as being co-located within a single processing unit, in implementations in which processor 108 includes multiple processing units, one or more of modules 112, 114, 116, 118 may be located remotely from the other modules. The description of the functionality provided by the different modules 112, 114, 116, 118 described below is for illustrative purposes, and is not intended to be limiting, as any of modules 112, 114, 116, 118 may provide more or less functionality than is described. For example, one or more of modules 112, 114, 116, 118 may be eliminated, and some or all of its functionality may be provided by other ones of modules 112, 114, 116, 118. As another example, processor 108 may be configured to execute one or more additional modules that may perform some or all of the functionality attributed below to one of modules 112, 114, 116, 118.

Figure 8:
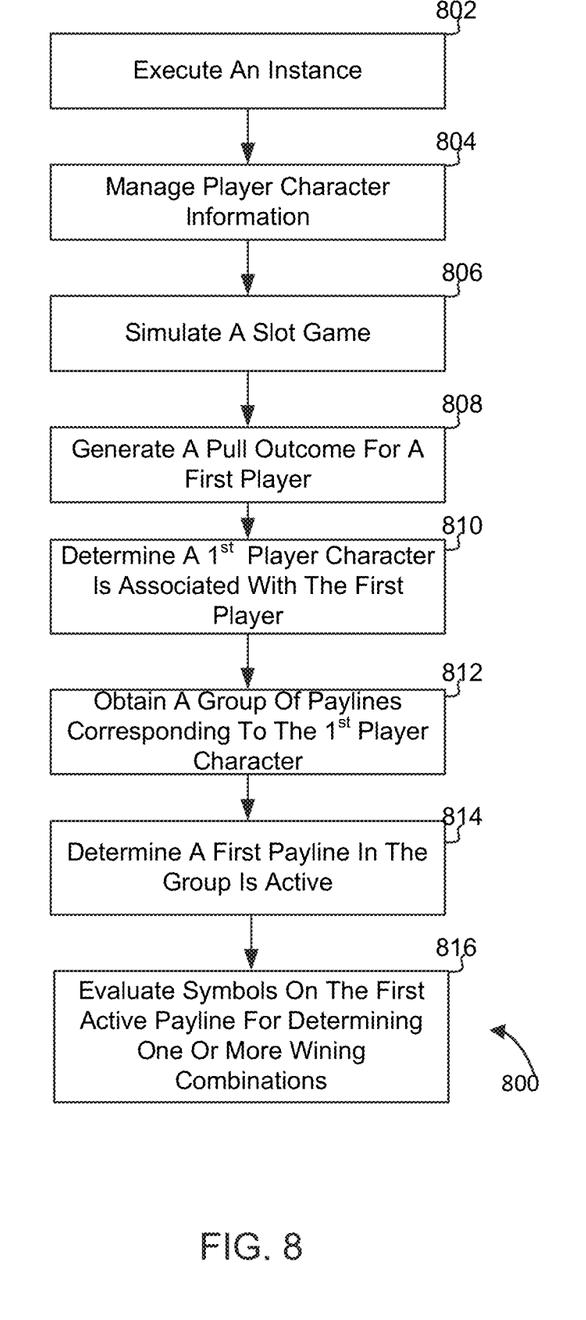
FIG. 8 illustrates one exemplary method for determining paylines in a slot game based on player characters in accordance with the disclosure.

FIG. 8 illustrates one exemplary method 800 for determining paylines in a slot game based on player characters in accordance with the disclosure. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8A and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, player character information regarding player characters associated with players in a slot game may be managed. The player character information managed in operation 802 may indicate, without limitation, name, level, race, class, size, age, gender, height, weight, alignment, deity, abilities, skills, health, attack, defense, sense, magic spells, language, movement, speed, and/or any other attributes associated with the player characters. The player character information managed in operation 802 may include player character information regarding a first player character associated with a first player. In some implementations, operation 802 may be performed by a player character module the same as or similar to player character module 112 (shown in FIG. 1 and described herein).

At an operation 804, a slot game may be simulated. In some implementations, operation 804 may be performed by a slot game module the same as or similar to slot game module 114 (shown in FIG. 1 and described herein).

At an operation 806, a pull outcome may be generated for a first player in the slot game simulated in operation 804. The pull outcome generated in operation 806 may include stochastic configuration of symbols representing game space elements such as non-player characters, virtual items, virtual containers (e.g., mystery boxes), buildings, and/or any other game space elements. In some implementations, operation 806 may be performed by a slot game module the same as or similar to slot game module 114 (shown in FIG. 1 and described herein).

At an operation 808, a first player character associated with the first player may be determined. In some implementations, operation 808 may be performed by a player character module the same as or similar to player character module 112 (shown in FIG. 1 and described herein).

At an operation 810, a group of paylines corresponding to the first player character may be obtained. In some exemplary implementations, paylines corresponding to player characters may be determined and specified by provider, administrator, moderator, and/or any other entities related to the slot game in a file and stored in an electronic storage for access. In those implementations, the group of paylines corresponding to the first player character may be obtained from such a file. In some examples, the individual paylines corresponding to the first player character as obtained in operation 810 may be distinctive with respect to each other such that any two given paylines in the group may differ at least by one symbol. In some examples, the number of paylines corresponding to the first player character as obtained in operation 810 may correlate with the first player character information indicating, without limitations, a level, a class, a race, an amount of experience points, one or more skills, one or more virtual items and/or any other attributes associated with the first player character. In some implementations, operation 810 may be performed by a payline module the same as or similar to payline module 116 (shown in FIG. 1 and described herein).

At an operation 812, a first payline in the group of paylines obtained in operation 810 may be determined as active. The determination made in operation 810 may be based on the first player character information indicating, without limitations, a level, a class, a race, an amount of experience points, one or more skills, one or more virtual items and/or any other attributes associated with the first player character. In some implementations, operation 812 may be performed by a payline module the same as or similar to payline module 116 (shown in FIG. 1 and described herein).

At an operation 814, symbols appearing on the first active payline determined in operation 812 may be evaluated for determining one or more winning combinations of symbols. In some implementations, operation 814 may be performed by a slot game module the same as or similar to slot game module 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating a slot game, the system comprising
   one or more processors configured by machine-readable instructions to:
   manage player character information regarding characters associated with players of the slot game such that the player character information includes first player character information regarding a first character associated with a first player of the slot game;
   simulate the slot game for participation by the players and to generate, for the players, pull outcomes of the slot game, the pull outcomes including combinations of symbols such that the slot game generates, for the first player, a first pull outcome that includes a first combination of symbols; and
   determine paylines for determining outcomes of the slot game participated in by the players, the paylines being determined based on the types of characters associated with the players such that a first group of one or more paylines is determined, for the first player, based on a character type of the first character associated with the first player, the first group of paylines including a first payline determined based on the character type of the first character; and, wherein
   responsive to the first group of one or more paylines having been determined, the first combination of symbols in the first pull outcome is determined as a first winning combination of symbols for the first player based on the first payline.

2. The system of claim 1, wherein the one or more processors are further configured by machine-readable instructions such that the first group of paylines determined for the first player includes a second payline, the second payline intersecting the first payline such that the first and second paylines share at least one symbol in common, and the at least one symbol in common is determined as a winning symbol for the first player.

3. The system of claim 1, wherein the one or more processors are further configured by machine-readable instructions such that the first player character information indicating a first class associated with the first character, such that the first group of one or more paylines is determined based on the first class.

4. The system of claim 3, wherein the one or more processors are
   further configured by machine-readable instructions such that the player character information includes second player information regarding a second character associated with the first player, the second character information indicating a second class associated with the second character, the second class being different and distinct from the first class; and wherein the one or more processors are further configured by machine-readable instructions to:
   determine, for the first player, a second group of one or more paylines based on the second class, the second group of one or more paylines being distinct and different from the first group of one or more paylines; and
   determine for the first player, responsive to the second group of one or more paylines having been determined, a second combination of symbols included in the first pull outcome of the slot game as a second winning combination of symbols based on the second group of one or more paylines.

5. The system of claim 1, wherein the one or more processors are further configured by machine-readable instructions such that the determination of the first combination of symbols in the first pull outcome as the first winning combination of symbols for the first player is further based on the first player character information.

6. The system of claim 5, wherein the determination that the first combination of symbols in the first pull outcome as the first winning combination of symbols for the first player includes evaluating a number of symbols appearing on the first payline based on the first player character information.

7. The system of claim 5, wherein the first player character information includes a level, one or more abilities, one or more skills, and/or one or more virtual items associated with the first player character.

8. The system of claim 1, wherein the one or more processors are further configured by machine-readable instructions to determine a first number of paylines in the first group as active paylines for the first player based on a level, one or more abilities, one or more skills, and/or one or more virtual items associated with the first player character.

9. The system of claim 1, wherein the one or more processors are further configured by machine-readable instructions to implement gameplays in a game space associated with the slot game based on combinations of symbols included in pull outcomes of the slot game such that a first gameplay is implemented in the game space based on the first winning combination of symbols.

10. A method for facilitating a slot game, the method being implemented in one or more physical processors configured by machine-readable instructions, the method comprising:
    managing, by the one or more physical processors, player character information regarding characters associated with players of the slot game such that the player character information includes first player character information regarding a first character associated with a first player of the slot game;
    simulating, by the one or more physical processors, the slot game for participation by the players and to generate, for the players, pull outcomes of the slot game, the pull outcomes including combinations of symbols such that generating, for the first player, a first pull outcome that includes a first combination of symbols;
    determining, by the one or more physical processors, paylines for determining outcomes of the slot game participated in by the players, the paylines being determined based on the types of characters associated with the players such that a first group of one or more is determined, for the first player, based on a character type of the first character associated with the first player, the first group of paylines including a first payline determined based on the character type of the first character; and
    responsive to the first group of one or more paylines having been determined, determining, by the one or more physical processors, that the first combination of symbols in the first pull outcome as a first winning combination of symbols for the first player based on the first payline.

11. The method of claim 10, wherein the first group of paylines determined for the first player includes a second payline, the second payline intersecting the first payline such that the first and second paylines share at least one symbol in common, and wherein the method further comprises determining that the at least one symbol in common as a winning symbol for the first player.

12. The method of claim 10, wherein the first player character information indicates a first class associated with the first character, and wherein the first group of one or more paylines is determined based on the first class.

13. The method of claim 12, wherein the player character information includes second player information regarding a second character associated with the first player, the second character information indicating a second class associated with the second character, the second class being different and distinct from the first class, and wherein the method further comprises
    determining, by the one or more physical processors, for the first player, a second group of one or more paylines based on the second class, the second group of one or more paylines being distinct and different from the first group of one or more paylines; and
    responsive to the second group of one or more active paylines having been determined, determining, by the one or more physical processors, for the first player, a second combination of symbols included in the first pull outcome of the slot game as a second winning combination of symbols based the second group of one or more paylines.

14. The method of claim 10, wherein the determination of the first combination of symbols in the first pull outcome as the first winning combination of symbols for the first player is further based on the first player character information.

15. The method of claim 14, wherein the determination that the first combination of symbols in the first pull outcome as the first winning combination of symbols for the first player includes evaluating a number of symbols appearing on the first payline based on the first player character information.

16. The method of claim 14, wherein the first player character information includes a level, one or more abilities, one or more skills, and/or one or more virtual items associated with the first player character.

17. The method of claim 10, further comprising determining a first number of paylines in the first group as active paylines for the first player based on a level, one or more abilities, one or more skills, and/or one or more virtual items associated with the first player character.

18. The method of claim 10, further comprising implementing gameplays in a game space associated with the slot game based on combinations of symbols included in pull outcomes of the slot game such that implementing a first gameplay in the game space based on the first winning combination of symbols.

* * * * *